United States Patent
Robbin et al.

(10) Patent No.: US 7,815,017 B2
(45) Date of Patent: *Oct. 19, 2010

(54) LIFTING STATION IN A SURFACE TREATMENT INSTALLATION

(75) Inventors: Joerg Robbin, Ammerbuch (DE); Juergen Hanf, Tuebingen (DE)

(73) Assignee: Eisenmann Anlagenbau GmbH & Co. KG, Boeblingen (DE)

( * ) Notice: Subject to any disclaimer, the term of this patent is extended or adjusted under 35 U.S.C. 154(b) by 986 days.

This patent is subject to a terminal disclaimer.

(21) Appl. No.: 11/189,091

(22) Filed: Jul. 25, 2005

(65) Prior Publication Data

US 2007/0007079 A1    Jan. 11, 2007

(51) Int. Cl.
B66F 7/10    (2006.01)

(52) U.S. Cl. .............. 187/210; 187/203; 187/222; 187/223; 187/224; 187/225; 187/226; 187/227; 187/228; 187/229; 187/230

(58) Field of Classification Search ............... 187/203, 187/210, 222–230
See application file for complete search history.

(56) References Cited

U.S. PATENT DOCUMENTS

| | | | | |
|---|---|---|---|---|
| 2,656,940 A * | 10/1953 | Sumners et al. | ............ | 414/257 |
| 3,416,684 A * | 12/1968 | Barry | ............ | 414/499 |
| 3,474,925 A * | 10/1969 | McCartney et al. | ............ | 414/471 |
| 3,885,685 A * | 5/1975 | Montgomery et al. | ............ | 414/391 |
| 5,018,926 A * | 5/1991 | Sternad | ............ | 414/253 |
| 5,165,842 A * | 11/1992 | Hammer | ............ | 414/800 |
| 5,456,562 A * | 10/1995 | Schlecker et al. | ............ | 414/254 |
| 5,829,948 A * | 11/1998 | Becklund | ............ | 414/607 |
| 5,896,948 A * | 4/1999 | Suur-Askola et al. | ............ | 187/290 |
| 6,213,025 B1 * | 4/2001 | Sauerwein et al. | ............ | 104/121 |
| 6,457,904 B2 * | 10/2002 | Bishop et al. | ............ | 405/3 |
| 6,824,345 B2 * | 11/2004 | Hansl et al. | ............ | 414/282 |
| 6,929,440 B1 * | 8/2005 | Grond | ............ | 414/284 |
| 6,991,087 B2 * | 1/2006 | Krannich et al. | ............ | 198/465.1 |
| 2002/0021956 A1 * | 2/2002 | Winkler | ............ | 414/349 |
| 2002/0162705 A1 * | 11/2002 | Shadkin et al. | ............ | 187/290 |
| 2004/0197172 A1 * | 10/2004 | Hansl et al. | ............ | 414/281 |
| 2005/0194217 A1 * | 9/2005 | Smith et al. | ............ | 187/247 |
| 2005/0279973 A1 * | 12/2005 | Rea | ............ | 254/1 |

FOREIGN PATENT DOCUMENTS

| | | |
|---|---|---|
| DE | 34 23 916 A1 | 1/1986 |
| DE | 100 44 195 A1 | 3/2002 |
| DE | 102004033548.6 | 7/2004 |
| EP | 0 393 773 A1 | 10/1990 |

* cited by examiner

*Primary Examiner*—Walter Benson
*Assistant Examiner*—Kawing Chan
(74) *Attorney, Agent, or Firm*—Factor & Lake, Ltd.

(57) ABSTRACT

A lifting station for vertically moving an object, in particular a vehicle body, in a surface treatment installation includes a fixed support structure and a vertically movable lifting cradle which is supported on the support structure and on which at least one conveying device is arranged. Energy for actuating the conveying device can be stored in an energy accumulator arranged on the lifting cradle. In this way, a trailing cable which supplies the conveying device with energy in different lifting positions is not required.

17 Claims, 4 Drawing Sheets

LIFTING STATION IN A SURFACE TREATMENT INSTALLATION

The invention relates to a lifting station for vertically moving an object, in particular a vehicle body, in a surface treatment installation, comprising a fixed support structure and a vertically movable lifting cradle which is supported on the support structure and on which at least one conveying device is arranged.

Surface treatment installations are used for treating surfaces of objects in various ways, e.g. by applying paints and other coatings. Such installations frequently include a plurality of individual treatment stations for different treatment steps, e.g. preparation, painting and drying. For this purpose the objects to be treated, which may be, for example, motor vehicle bodies or other sheet metal parts, are conveyed from treatment station to treatment station by means of a conveyor system.

In this case the surface treatment installation also includes zones between and after the treatment stations, in which the objects to be treated are only conveyed, temporarily stored or sorted. The conveying, temporary storage and sorting of the objects to be treated often takes place on a plurality of levels one above another. In these cases it is necessary to move the objects vertically between different levels.

A vertical movement is also required if individual stations of the surface treatment installation are for certain reasons arranged at different levels relative to other stations. For example, if the objects are to be treated at one station with gases which are heavier than the ambient atmosphere, such a treatment is frequently carried out in a sunken zone, for example, a kind of vat, so that the smallest possible amount of gases escapes via entry and exit openings of the zone. In treatment with lighter gases or with hot air, by contrast, it is more advantageous, for the same reasons, to arrange the treatment zone higher.

Lifting stations known in the prior art, that are provided for vertically moving objects in surface treatment installations, have a lifting cradle which is guided by means of guide rollers in the vertical direction (lifting direction). This means that the lifting cradle can move only in the vertical direction but is fixed with respect to a support structure in the directions perpendicular thereto. Arranged on the lifting cradle is a conveying device which may be, for example, a roller conveyor or a chain conveyor. The conveying device makes it possible to transfer the objects from a conveyor system arranged upstream to the lifting cradle and from there—after the vertical movement—to a conveyor system arranged downstream. The conveyor systems may, of course, also be replaced by other feed devices such as fork-lift trucks or the like.

For its operation during these transfer processes the conveying device requires energy. For this reason, in the known lifting stations the lifting cradle is connected to an external voltage supply via a trailing cable.

It has been shown, however, that such trailing cables are disadvantageous in practice for various reasons. To prevent the trailing cable from touching the usually more or less unprotected surfaces of the objects during displacement of the lifting cradle, or being crushed between moving parts of the lifting station, a guide structure with a plurality of moving parts, which restricts movements of the trailing cable to a predefined spatial area, is generally required. In particular in the case of lifting stations which can attain considerable heights, such guidance structures can be very complex and costly. In addition, trailing cables which tolerate high bending loads over relatively long periods are very expensive. If the lifting station with the lifting cradle is located in a hot zone, e.g. upstream or downstream of a drier, the trailing cables are heavily stressed not only by the movement but also by the ambient air which can be heated above 200° C. In addition, dirt particles can be deposited on the trailing cables and their guide structures and may fall on to freshly painted parts during the movement.

It is therefore the object of the invention so to improve a lifting station of the type mentioned in the introduction that problems associated with the use of trailing cables are at least partially avoided.

This object is achieved in a lifting station of the type mentioned in the introduction by an energy accumulator arranged on the lifting cradle, in which energy accumulator the energy for actuating the conveying device can be stored.

The invention is based on recognition of the fact that the quantities of energy required for conveying the objects to be moved on the conveying device are almost universally so small that they can be made available by an energy accumulator arranged on the lifting cradle. It is therefore possible to use a small and therefore light energy accumulator which—in comparison to the known energy supply with trailing cable—at most only slightly reduces the useful load that can be moved vertically by the lifting station. It must be borne in mind in this connection that the trailing cables and their guide structures have a not inconsiderable weight, especially in lifting stations designed for relatively large lifting heights.

As a result of the trailing cable no longer being required, the lifting station according to the invention can therefore be manufactured and operated at lower overall cost.

Because energy is withdrawn from the energy accumulator each time the conveying device is operated, said energy accumulator must be regularly recharged. For this purpose the lifting station may include a fixed charging station for charging the energy accumulator.

Such a charging station preferably includes an energy transfer device with which energy can be transferred to the energy accumulator in at least one predefined lifting position of the lifting cradle. The energy transferred may in principle be any form of energy which leads to an increase in the energy density within the energy accumulator. For example, electrical energy, chemical energy (fuels), mechanical energy or radiation energy can be considered.

Electrical energy is advantageous in that relatively large quantities of energy can thereby be transferred rapidly to the energy accumulator in the at least one lifting position using low-cost components, which energy accumulator may then be in the form, for example, of a rechargeable storage battery. Moreover, electrical control units and measuring devices, which in some cases are required in connection with the control system of the conveying device, can be fed with electrical energy.

In the simplest case the energy transfer device then includes a fixed electrical contact and a movable electrical contact which is arranged on the lifting cradle and cooperates with the fixed contact in the at least one predefined position of the lifting cradle.

If easily inflammable gases or solids are in the environment of the lifting station, it may in some cases be more advantageous to use an energy transfer device which makes possible an inductive transfer of electrical energy. With inductive energy transfer, sparks which frequently occur with electrical contacts, e.g. with loose contacts, practically cannot be produced. An energy transfer device based on the induction principle may include a first, fixed induction loop and a second induction loop arranged on the lifting cradle.

Alternatively or additionally to a charging station, an energy generating device which obtains energy from the relative motion between the support structure and the lifting cradle may be fixed to the lifting cradle. The load on a drive which generates the relative motion between the lifting cradle and the support structure is increased only slightly by this kind of energy generation because, as already mentioned, the energy required to convey the objects in the horizontal direction is considerably less than the energy needed to move the objects vertically. The omission of a charging station made possible by this type of energy generation further simplifies the design of the lifting station.

The energy derived from the relative motion between the support structure and the lifting cradle may be obtained, for example, by means of a friction wheel which runs along the lifting structure, or a gear wheel which meshes with a rack, as the lifting cradle moves vertically. The rotation of the wheel during the movement of the lifting cradle can then be converted to a form of energy that can be stored in the energy accumulator. It is possible, for example, to use the wheel to drive a piston which increases the pressure of a pressure medium in a pressure accumulator. It is also possible in principle to drive a flywheel in this context.

However, it is especially simple if the energy generating device includes an electric generator, e.g. a roller dynamo. In this way the kinetic energy generated by the relative motion is converted into electrical energy which can be stored in a storage battery.

Further advantages and features of the invention will be apparent from the following description of embodiments, with reference to the drawings, in which.

Figure 1:
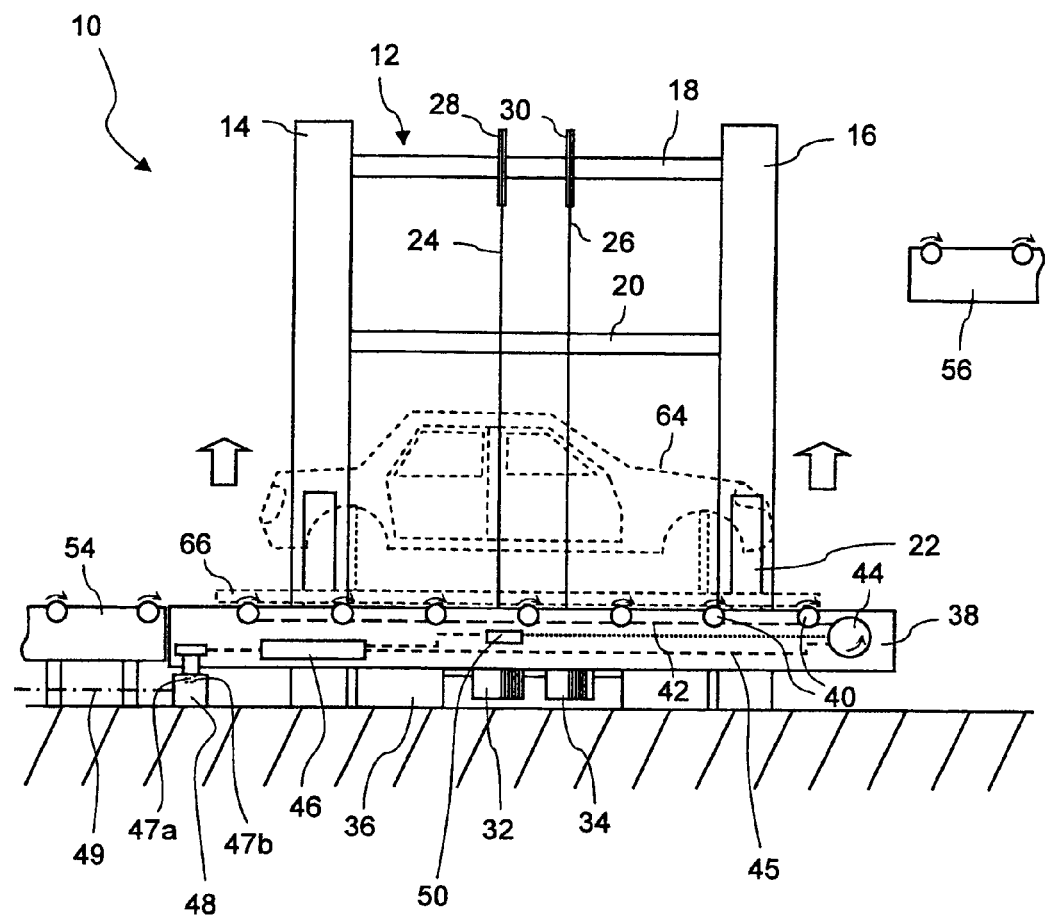
FIG. 1 is a front view of a first embodiment of a lifting station according to the invention, in which a storage battery is charged via an external charging station connected via a plug contact when a lifting cradle is in a lower lifting position.

FIG. 1 shows a first embodiment of a lifting station denoted as a whole by 10 in a front view. The lifting station 10 includes a support structure 12 composed of two vertical guide posts 14, 16 and crossbeams 18, 20 connecting same. The guide posts 14, 16 and the crossbeams 18, 20 may be made, for example, of steel profiles of rectangular or circular cross-section.

A lifting cradle 22 is supported on the support structure 12 via a plurality of guide rollers in a manner not illustrated in detail. The guide rollers bear against the guide posts 14, 16 on a plurality of sides and ensure that the lifting cradle 22 can move freely in the vertical direction while being fixed with respect to the support structure 12 perpendicularly to the vertical direction.

Acting upon the lifting cradle 22 are two steel cables 24, 26 which are guided over deflection rollers 28, 30 fixed to the upper crossbeam 18 to downwardly-located cable drums 32, 34 on which they are wound. The cable drums 32, 34 may be set in rotation by means of a drive motor 36, the lifting cradle 22 being lowered or raised depending on the direction of rotation of the cable drums 32, 34.

A roller conveyor 38 with which objects to be moved vertically can be conveyed in the longitudinal direction of the crossbeams 18, 20 is fixed to support arms of the lifting cradle 22 oriented in the direction of the viewer. For this purpose the roller conveyor 38 includes a multiplicity of rollers 40 which are connected via a chain 42, illustrated only partially and with broken lines for reasons of clarity, to an electric roller drive 44. Instead of a chain 42, a toothed belt or the like may, of course, be used.

The roller drive 44 is connected to a rechargeable storage battery 46 via a line 45. In the case of lifting stations which are used for vertically moving motor vehicle bodies on painting lines, a capacity of the storage battery 46 of the order of magnitude of approximately 200 mAh is sufficient. Any conventional car battery is therefore suitable in principle for use as the energy accumulator for the roller conveyor 38. However, car batteries are not designed for the short-duration but high loads involved here, so that it may be more advantageous to use other types of storage battery. The use of a plurality of individual, smaller storage batteries each having a capacity of the order of magnitude of 100 mAh may also be advantageous.

The accumulator 46 is connected to a contact plug indicated at 47*a* (see FIG. 2) which, in the lower lifting position shown in FIG. 1, establishes an electrical contact with a corresponding counterpart 47*b* of a charging station 48. Plug arrangements suitable for such purposes, which are sensitive to relatively small positional tolerances and ensure a reliable electrical connection even after many thousands of connection operations, are known on the market. The charging station 48, the charging current of which is coordinated in a manner known per se with the charging behaviour of the storage battery 46, is connected to a voltage supply (not visible in FIG. 1) via a line 49.

In addition, the storage battery 46 ensures the voltage supply of a control unit 50 of the roller conveyor 38, which control unit 50 controls the roller drive 44. The control unit 50 may obtain line-conducted positional information from position sensors. Furthermore, the control unit 50 may, if required, cooperate in a wireless manner with a higher overall control system of the lifting station.

Also visible in FIG. 1 is a part of a lower conveyor system 54 which is also in the form of a roller conveyor. On the opposite side of the roller conveyor an upper conveyor system 56 is located at the level of an upper lifting position.

The operation of the above-described lifting station 10 is explained below with reference to FIGS. 1 and 2.

It should be assumed that the vertically movable object is a painted motor vehicle body, which is designated 64 and indicated by broken lines in FIG. 1, and is fixed to a carrier referred to as skid 66. The motor vehicle body 64 is to be moved vertically from the lower conveyor system 54 to the upper conveyor system 56 by means of the lifting station 10, in order to transfer the motor vehicle body 64 to a drying zone through which the upper conveyor system 56 extends.

The overall control system first ensures that the lifting cradle 22 is moved to its lower lifting position in which the roller conveyor 38 is at the same level as the lower conveyor system 54. As the lifting cradle 22 is lowered the contact plug 47 on the lifting cradle 22 is inserted into the charging station 48. Electrical energy is thereby available for charging the storage battery 46 and for actuating the roller drive 44. The latter actuates the rollers 40 via the chain 42. The motor vehicle body 64 can now be transferred to the roller conveyor 38 via the lower conveyor system 54. Control information of the kind known in the prior art in connection with trailing cables can now be transmitted via the closed circuit if required.

As soon as the skid 66 is conveyed only by the rollers 40 of the roller conveyor 38, the control unit 50 causes a continuous reduction of the drive power of the roller drive 44. In this way the rollers 40, and therefore the skid 66 guided thereon, are brought to a standstill. This state is shown in FIG. 1.

An overall control system of the lifting station 10 now causes the drive motor 36 to raise the lifting cradle 22 with the motor vehicle body 64 arranged thereon until the upper lifting position is reached. After the lifting cradle 22 has reached its upper lifting position, the control unit 50 causes the roller drive 44 to set the rollers 40 in motion again, whereby the skid 66 with the body 64 fixed thereon is moved to the upper conveyor system 56. The energy for the control unit 50 and above all for the roller drive 44 is drawn from the storage battery 46. The rollers of the upper conveyor system 56 finally take over the skid 66 and transfer the motor vehicle body 64 to the adjoining drying zone. The situation during the transfer of the motor vehicle body 64 to the upper conveyor system 56 is shown in FIG. 2.

Figure 2:
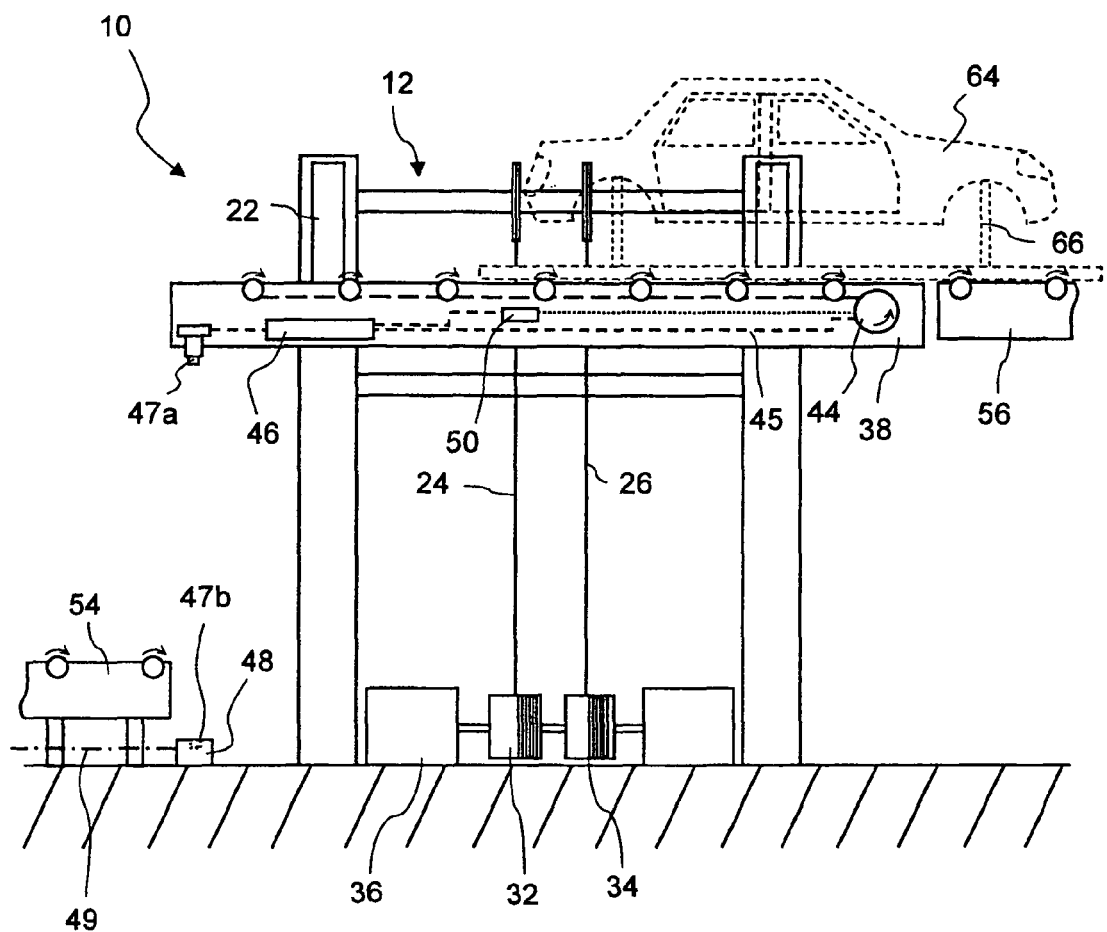
FIG. 2 shows the lifting station illustrated in FIG. 1, the lifting cradle being located in an upper lifting position.
Figure 3:
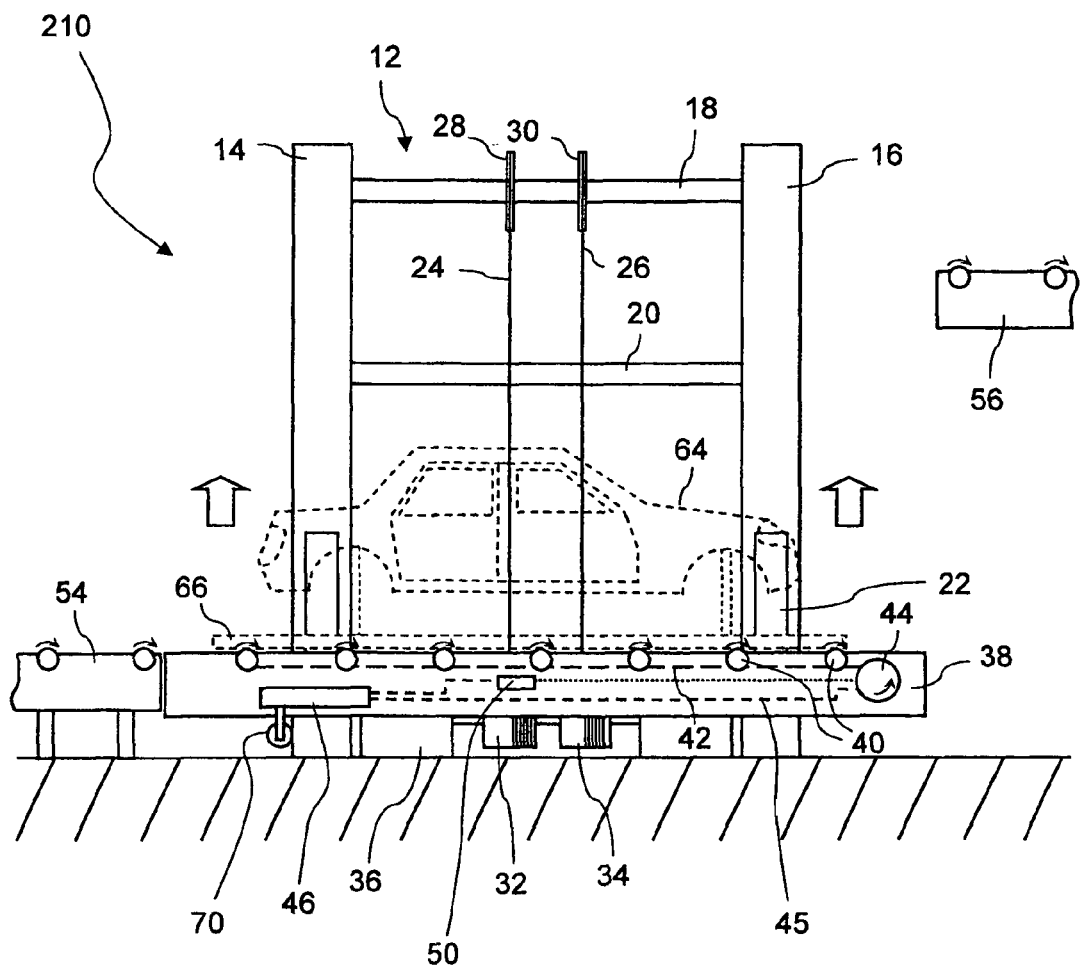
FIG. 3 is a front view of a second embodiment of a lifting station according to the invention, in which a storage battery is charged during a movement via a roller dynamo, shown in the lower lifting position of the lifting cradle.
Figure 4:
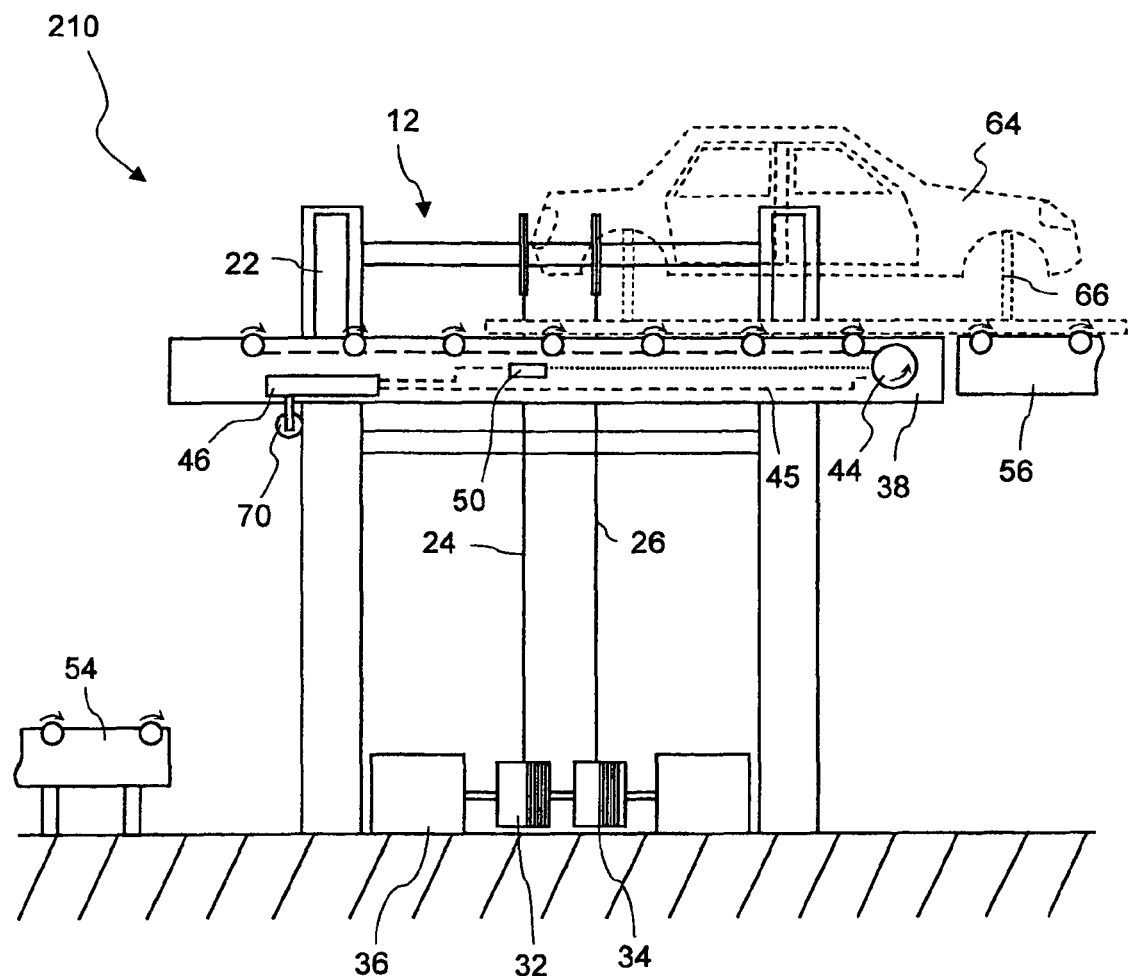
FIG. 4 shows the lifting station illustrated in FIG. 3, the lifting cradle being located in an upper lifting position.

FIGS. 3 and 4 show a further embodiment of a lifting station in representations corresponding to those of FIGS. 1 and 2. The same or corresponding parts are referred to by the same reference numerals.

In the lifting station shown in FIGS. 3 and 4 and designated as a whole by 210 the storage battery is charged not by an external charging station but by means of a dynamo 70. The dynamo 70 may be, for example, a conventional roller dynamo as used similarly for the lighting of bicycles. In this case the roller of the roller dynamo 70 bears against the support structure 12, here the left-hand guide post 14. The roller dynamo 70 is actuated, and the storage battery 46 thereby charged, each time the lifting cradle 22 moves vertically along the support structure 12.

The lifting station shown in FIGS. 3 and 4 otherwise corresponds with regard to construction and operation to the lifting station 10 explained above with reference to FIGS. 1 and 2.

The invention claimed is:

1. Lifting station for vertically moving an object, in particular a vehicle body, in a surface treatment installation, comprising a fixed support structure, a vertically movable lifting cradle which is supported on the support structure and on which at least one conveying device is permanently attached arranged, an energy accumulator permanently attached arranged on the lifting cradle, wherein energy for actuating the conveying device can be stored on the energy accumulator, and an energy generating device fixed to the lifting cradle, which energy generating device obtains energy from a relative motion between the support structure and the lifting cradle during movement thereof.

2. Lifting station according to claim 1, characterised by a fixed charging station for charging the energy accumulator.

3. Lifting station according to claim 2, characterised in that the charging station includes at least one energy transfer device with which energy can be transferred to the energy accumulator in at least one predefined lifting position of the lifting cradle.

4. Lifting station according to claim 3, characterised in that the energy transfer device includes a fixed electrical contact and a movable electrical contact which is arranged on the lifting cradle and which cooperates with the fixed contact in the at least one predefined lifting position of the lifting cradle.

5. Lifting station according to claim 3, characterised in that the energy transfer device makes possible inductive transfer of electrical energy.

6. Lifting station according to claim 5, characterised in that the energy transfer device includes a first, fixed induction loop and a second induction loop arranged on the lifting cradle.

7. Lifting station according to claim 1, characterised in that the energy is electrical energy.

8. Lifting station according to claim 7, characterised in that the energy transfer device includes a fixed electrical contact and a movable electrical contact which is arranged on the lifting cradle and which cooperates with the fixed contact in the at least one predefined lifting position of the lifting cradle.

9. Lifting station according to claim 8, characterised in that the energy accumulator is a storage battery.

10. Lifting station according to claim 7, characterised in that the energy transfer device makes possible inductive transfer of electrical energy.

11. Lifting station according to claim 10, characterised in that the energy transfer device includes a first, fixed induction loop and a second induction loop arranged on the lifting cradle.

12. Lifting station according to claim 11, characterised in that the energy generating device includes an electric generator.

13. Lifting station according to claim 12, characterised in that the electric generator is a roller dynamo.

14. Lifting station according to claim 1, characterised in that the energy generating device includes an electric generator.

15. Lifting station according to claim 14, characterised in that the electric generator is a roller dynamo.

16. Lifting station according to claim 1, characterised in that the energy accumulator is a storage battery.

17. Lifting station for vertically moving an object, comprising
   a) a fixed support structure,
   b) a vertically movable lifting cradle which is supported on the support structure,
   c) a conveying device which is permanently attached on the lifting cradle,
   d) an energy accumulator which is permanently attached on the lifting cradle, wherein energy for actuating a roller drive is stored on the energy accumulator, and
   e) a roller dynamo which is permanently arranged on the lifting cradle, wherein the roller dynamo
      obtains energy from a relative motion between the support structure and the lifting cradle during movement thereof,
      comprises a roller that bears against the support structure and is rotated if the roller dynamo moves vertically along the support structure, and
      is configured to load the energy accumulator with the obtained energy.

* * * * *